(12) United States Patent
Ose et al.

(10) Patent No.: US 11,329,315 B2
(45) Date of Patent: May 10, 2022

(54) ALL-SOLID-STATE LITHIUM ION SECONDARY BATTERY

(71) Applicant: TOYOTA JIDOSHA KABUSHIKI KAISHA, Toyota (JP)

(72) Inventors: Norihiro Ose, Shizuoka-ken (JP); Hajime Hasegawa, Susono (JP); Mitsutoshi Otaki, Susono (JP); Yusuke Kintsu, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 216 days.

(21) Appl. No.: 16/605,637

(22) PCT Filed: Apr. 13, 2018

(86) PCT No.: PCT/JP2018/015576
§ 371 (c)(1),
(2) Date: Oct. 16, 2019

(87) PCT Pub. No.: WO2018/193992
PCT Pub. Date: Oct. 25, 2018

(65) Prior Publication Data
US 2020/0119396 A1  Apr. 16, 2020

(30) Foreign Application Priority Data

Apr. 18, 2017 (JP) .............................. JP2017-082228

(51) Int. Cl.
*H01M 10/0562* (2010.01)
*H01M 4/134* (2010.01)
(Continued)

(52) U.S. Cl.
CPC ....... *H01M 10/0562* (2013.01); *H01M 4/134* (2013.01); *H01M 4/40* (2013.01); *H01M 4/668* (2013.01); *H01M 2300/0065* (2013.01)

(58) Field of Classification Search
CPC ............. H01M 10/0562; H01M 4/134; H01M 2300/0068
See application file for complete search history.

(56) References Cited

U.S. PATENT DOCUMENTS

2015/0147660 A1   5/2015  Fujiki et al.
2019/0305293 A1*  10/2019  Sotowa ................. H01M 4/587

FOREIGN PATENT DOCUMENTS

JP  2012-129150 A  7/2012
JP  2013-069416 A  4/2013
(Continued)

*Primary Examiner* — Stephan J Essex
(74) *Attorney, Agent, or Firm* — Sughrue Mion, PLLC

(57) ABSTRACT

Disclosed is an all-solid-state lithium ion secondary battery including an anode that contains, as an anode active material, at least one selected from the group consisting of a metal that is able to form an alloy with Li, an oxide of the metal, and an alloy of the metal and Li, and being excellent in cycle characteristics. The all-solid-state lithium ion secondary battery may be an all-solid-state lithium ion secondary battery, wherein an anode comprises an anode active material, an electroconductive material and a solid electrolyte; wherein the anode active material comprises at least one active material selected from the group consisting of a metal that is able to form an alloy with Li, an oxide of the metal, and an alloy of the metal and Li; and wherein the solid electrolyte is particles with a BET specific surface area of from 1.8 m²/g to 19.7 m²/g.

5 Claims, 1 Drawing Sheet

(51) Int. Cl.
*H01M 4/40* (2006.01)
*H01M 4/66* (2006.01)

(56) References Cited

FOREIGN PATENT DOCUMENTS

JP 2015-103451 A 6/2015
WO 2013/137224 A1 9/2013

* cited by examiner

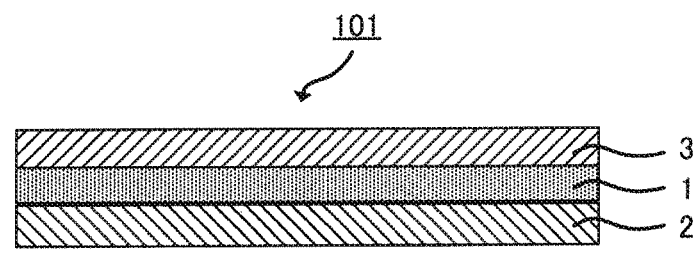

ALL-SOLID-STATE LITHIUM ION SECONDARY BATTERY

CROSS REFERENCE TO RELATED APPLICATIONS

This application is a National Stage of International Application No. PCT/JP2018/015576 filed Apr. 13, 2018, claiming priority based on Japanese Patent Application No. 2017-082228 filed Apr. 18, 2017.

TECHNICAL FIELD

The disclosure relates to an all-solid-state lithium ion secondary battery.

BACKGROUND ART

An active material (an alloy-based active material) containing a metal such as Si, the metal being able to form an alloy with Li, has a large theoretical capacity per volume compared to carbon-based anode active materials. Therefore, a lithium ion battery using such an alloy-based active material in its anode, has been proposed.

Patent Literature 1 discloses a negative electrode mixture for a secondary battery, the mixture comprising, as a negative electrode active material powder, an alloy-based active material having an average particle diameter of 10 μm or less. Patent Literature 1 also discloses an all-solid lithium ion battery comprising an anode layer that contains the negative electrode active material powder.

CITATION LIST

Patent Literature 1: Japanese Patent Application Laid-Open No. 2013-069416

SUMMARY OF INVENTION

Technical Problem

However, the all-solid-state lithium ion secondary battery as disclosed in Patent Literature 1 which uses an alloy-based active material as an anode active material, shows a low capacity retention rate when it repeats charge-discharge cycles.

In light of this circumstance, an object of the disclosed embodiments is to provide an all-solid-state lithium ion secondary battery including an anode that comprises, as an anode active material, at least one active material selected from the group consisting of a metal that is able to form an alloy with Li, an oxide of the metal, and an alloy of the metal and Li, and being excellent in cycle characteristics.

Solution to Problem

The all-solid-state lithium ion secondary battery of the disclosed embodiments is an all-solid-state lithium ion secondary battery, wherein an anode comprises an anode active material, an electroconductive material and a solid electrolyte; wherein the anode active material comprises at least one active material selected from the group consisting of a metal that is able to form an alloy with Li, an oxide of the metal, and an alloy of the metal and Li; and wherein the solid electrolyte is particles with a BET specific surface area of from 1.8 m²/g to 19.7 m²/g.

For the solid electrolyte of the all-solid-state lithium ion secondary battery of the disclosed embodiments, a value A obtained by the following formula (1) may be in a range of from 12.4 to 56.7:

$$A = \text{BET specific surface area } (m^2/g) \times \text{median diameter } D50 \, (\mu m) \times \text{density } (g/cm^3) \quad \text{Formula (1)}$$

The anode active material of the all-solid-state lithium ion secondary battery of the disclosed embodiments, may comprise at least one active material selected from the group consisting of elemental silicon and an alloy of Si and Li.

The solid electrolyte of the all-solid-state lithium ion secondary battery of the disclosed embodiments, may be a sulfide solid electrolyte.

The electroconductive material of the all-solid-state lithium ion secondary battery of the disclosed embodiments, may be at least one carbonaceous material selected from the group consisting of carbon black, carbon nanotube and carbon nanofiber.

Advantageous Effects of Invention

According to the disclosed embodiments, the all-solid-state lithium ion secondary battery can be provided, the battery including an anode that comprises, as an anode active material, at least one active material selected from the group consisting of a metal that is able to form an alloy with Li, an oxide of the metal, and an alloy of the metal and Li, and being excellent in cycle characteristics.

BRIEF DESCRIPTION OF DRAWING

FIG. 1 is a schematic view of an example of the structure of an all-solid-state lithium ion secondary battery.

DESCRIPTION OF EMBODIMENTS

The all-solid-state lithium ion secondary battery according to the disclosed embodiments is an all-solid-state lithium ion secondary battery, wherein an anode comprises an anode active material, an electroconductive material and a solid electrolyte; wherein the anode active material comprises at least one active material selected from the group consisting of a metal that is able to form an alloy with Li, an oxide of the metal, and an alloy of the metal and Li; and wherein the solid electrolyte is particles with a BET specific surface area of from 1.8 m²/g to 19.7 m²/g.

The metal that is able to form an alloy with Li is low in ion conductivity and electron conductivity. Therefore, when the metal is used as an anode active material, generally, an electroconductive material and a solid electrolyte are incorporated in the anode, in combination with the anode active material.

When the metal that is able to form an alloy with Li (hereinafter, the metal that is able to form an alloy with Li may be referred to as M) is used as the anode active material, along with the charging of the lithium ion secondary battery, the reaction represented by the following formula (2), that is, a so-called electrochemical alloying reaction, is initiated in the anode:

$$x\text{Li}^+ + xe^- + y\text{M} \rightarrow \text{Li}_x\text{M}_y \quad \text{Formula (2)}$$

Along with the discharging of the lithium ion secondary battery, as represented by the following formula (3), an extraction reaction of Li ions from the alloy of Si and Li, is initiated in the anode:

$$\text{Li}_x\text{M}_y \rightarrow x\text{Li}^+ + xe^- + y\text{M} \quad \text{Formula (3)}$$

The lithium ion secondary battery using the metal that is able to form an alloy with Li as the anode active material, undergoes a large volume change in association with the Li insertion/extraction reactions represented by the formulae (2) and (3).

Patent Literature 1 describes that the average particle diameter of a powder of an ion conductive material (solid electrolyte) is preferably small because, as the average particle diameter decreases, contact points between the anode active material and the solid electrolyte increase.

However, it was found that in the case of the all-solid-state lithium ion secondary battery including the anode that comprises an anode active material, an electroconductive material and a solid electrolyte, if the average particle diameter of the solid electrolyte is too small, the capacity retention rate of the battery may deteriorate especially at the initial stage.

If the average particle diameter of the solid electrolyte in the anode is decreased (that is, if the specific surface area is increased), which is advantageous from the viewpoint of ion conductivity, the electroconductive material is likely to adsorb to the surface of the solid electrolyte, however. Therefore, the electroconductive material is unevenly distributed in the anode and narrows an electron conducting path in the area where the amount of the electroconductive material is small.

As just described, in the area where the electron conducting path is narrow, the electron conducting path is gradually cut by repeating a volume change of the alloy-based active material in association with charging and discharging. As a result, it is considered that the capacity retention rate of the lithium ion secondary battery deteriorates.

In the all-solid-state lithium ion secondary battery of the disclosed embodiments, by using, in the anode, the solid electrolyte particles having a BET specific surface area in a specific range, uneven distribution of the electroconductive material can be prevented, while maintaining excellent ion conductivity. Therefore, it is considered that the capacity retention rate can be kept high even when the alloy-based active material is used as the anode active material.

Hereinafter, the all-solid-state lithium ion secondary battery of the disclosed embodiments will be described in detail.

1. All-Solid-State Lithium Ion Secondary Battery

The structure of the all-solid-state lithium ion secondary battery of the disclosed embodiments is not particularly limited, as long as the battery functions as a secondary battery. As shown in FIG. 1, typically, the all-solid-state lithium ion secondary battery of the disclosed embodiments comprises a cathode 2, an anode 3 and a solid electrolyte layer 1 disposed between the cathode 2 and the anode 3, which form a cathode-solid electrolyte layer-anode assembly 101. The cathode-solid electrolyte layer-anode assembly 101 is an assembly of members having the following array structure: the cathode, the solid electrolyte layer and the anode are arranged in this order; they may be directly attached or indirectly attached through a part composed of a different material; and a part composed of a different material may be attached to one or both of the opposite side of the cathode to the position where the solid electrolyte layer is present (the outer side of the cathode) and the opposite side of the anode to the position where the solid electrolyte layer is present (the outer side of the anode).

By attaching other members such as a current collector to the cathode-solid electrolyte layer-anode assembly 101, a cell, which is a functional unit of an all-solid-state battery, is obtained. The cell can be used as it is as an all-solid-state lithium ion battery, or a plurality of the cells can be electrically connected to form a cell assembly and used as the all-solid-state lithium ion battery of the disclosed embodiments.

For the cathode-solid electrolyte layer-anode assembly, generally, the thicknesses of the cathode and the anode are in a range of from about 0.1 μm to about 10 mm, and the thickness of the solid electrolyte layer is in a range of from about 0.01 μm to about 1 mm.

1-1. Anode

The anode of the all-solid-state lithium ion secondary battery of the disclosed embodiments comprises an anode active material, an electroconductive material and a solid electrolyte.

(Anode Active Material)

The anode active material comprises at least one active material selected from the group consisting of a metal that is able to form an alloy with Li, an oxide of the metal, and an alloy of the metal and Li.

The metal that is able to form an alloy with Li is not particularly limited, as long as it is a metal that can insert/extract Li ions along with the so-called electrochemical alloying reactions represented by the formulae (2) and (3). As the metal element that is able to form an alloy with Li, examples include, but are not limited to, Mg, Ca, Al, Si, Ge, Sn, Pb, Sb and Bi. Of them, the metal that is able to form an alloy with Li may be Si, Ge or Sn, and it may be Si. In the disclosed embodiments, the term "metal" is used as a concept including the following terms that are used for general classification of elements: "metal" and "semimetal".

The oxide of the metal that is able to form an alloy with Li, means such an oxide that along with the charging of the lithium ion secondary battery, M is produced in the anode by the electrochemical reaction represented by the following formula (4):

$$x\text{Li}^+ + xe^- + y\text{MO} \rightarrow \text{Li}_x\text{O}_y + y\text{M} \qquad \text{Formula (4)}$$

By the electrochemical reaction represented by the formula (2) or (3), Li can be inserted in and extracted from the M produced from the oxide of the metal that is able to form an alloy with Li by the formula (4). Therefore, generally, the oxide of the metal that is able to form an alloy with Li is classified into the category of alloy-based active materials. As with the metal that is able to form an alloy with Li, the oxide of the metal that is able to form an alloy with Li, has such a property that it undergoes a large volume change in association with the Li insertion/extraction reactions.

As the oxide of the metal that is able to form an alloy with Li, examples include, but are not limited to, SiO and SnO. The oxide may be SiO.

The percentage of the anode active material in the anode is not particularly limited. For example, it may be 40 mass % or more, may be in a range of from 50 mass % to 90 mass %, or may be in a range of from 50 mass % to 70 mass %.

The form of the metal that is able to form an alloy with Li, the oxide of the metal, and the alloy of the metal and Li, is not particularly limited. As the form, examples include, but are not limited to, a particle form and a film form.

(Solid Electrolyte)

The solid electrolyte is particles with a BET specific surface area of from 1.8 m$^2$/g to 19.7 m$^2$/g. As described above, by using the particles with a BET specific surface area of from 1.8 m$^2$/g to 19.7 m$^2$/g as the solid electrolyte in the anode, the capacity retention rate of the lithium ion secondary battery can be kept high.

As used herein, the BET specific surface area means a specific surface area calculated by the BET method using the monomolecular adsorption amount of gas adsorbed to the surface of a substance.

When the BET specific surface area is more than 19.7 m²/g, the electroconductive material adsorbs to the surface of the solid electrolyte, and the electroconductive material is unevenly distributed in the anode. Therefore, the electron conducting path is locally narrowed and results in a decrease in capacity retention rate. When the BET specific surface area is less than 1.8 m²/g, the number of contact points with the anode active material decreases and fails to maintain an ion conducting path, therefore.

To maintain the ion conducting path and the electron conducting path with balance, the BET specific surface area of the solid electrolyte particles may be from 3.0 m²/g to 9.0 m²/g.

For the solid electrolyte particles, the value A obtained by the following formula (1) may be in a range of from 12.4 to 56.7:

$$A = \text{BET specific surface area } (m^2/g) \times \text{median diameter } D50 \ (\mu m) \times \text{density } (g/cm^3) \quad \text{Formula (1)}$$

In the formula (1), the median diameter means such a diameter that the accumulated volume of the particles is a half (50%) of the whole volume when the particle diameters of the particles are arranged in ascending order.

The value A is a parameter indicating the form of the particles. When the particle form is a perfect spherical form, the value A is 6.0. In the disclosed embodiments, the form means a form that includes fine convexoconcaves on the particle surface and open pores present inside the particles.

In the case where the BET specific surface area of the solid electrolyte particles in the anode is in a range of from 1.8 m²/g to 19.7 m²/g, the capacity retention rate is increased by setting the value A in a range of from 12.4 to 56.7. It is difficult to produce solid electrolyte particles having a value A of less than 12.4. However, since the capacity retention rate tends to increase as the value A gets closer to 6.0, it is considered that the electroconductive material is less likely to present on the surface of the solid electrolyte particles, as the form of the particles gets closer to a perfect spherical form.

The raw material for the solid electrolyte particles is not particularly limited, as long as it is a raw material that is applicable to the all-solid-state lithium ion secondary battery. As the raw material, for example, an oxide-based non-crystalline solid electrolyte, a sulfide-based non-crystalline solid electrolyte, a crystalline oxide or a crystalline nitride, all of which have high Li ion conductivity, is preferably used.

As the oxide-based non-crystalline solid electrolyte, examples include, but are not limited to, $Li_2O$—$B_2O_3$—$P_2O_5$ and $Li_2O$—$SiO_2$. As the sulfide-based non-crystalline solid electrolyte, examples include, but are not limited to, $Li_2S$—$SiS_2$, $LiI$—$Li_2S$—$SiS_2$, $LiI$—$Li_2S$—$P_2S_5$, $LiI$—$Li_3PO_4$—$P_2S_5$ and $Li_2S$—$P_2S_5$. As the crystalline oxide and the crystalline nitride, examples include, but are not limited to, $LiI$, $Li_3N$, $Li_5La_3Ta_2O_{12}$, $Li_7La_3Zr_2O_{12}$, $Li_6BaLa_2Ta_2O_{12}$, $Li_3PO_{(4-3/2w)}N_w$ (w<1) and $Li_{3.6}Si_{0.6}P_{0.4}O_4$.

The percentage of the solid electrolyte in the anode is not particularly limited. For example, it may be 10 mass % or more, may be in a range of from 20 mass % to 50 mass %, or may be in a range of from 25 mass % to 45 mass %.

(Electroconductive Material)

The electroconductive material is not particularly limited, as long as it is an electroconductive material that is, in the anode, applicable to the all-solid-state lithium ion secondary battery. As the raw material for the electroconductive material, examples include, but are not limited to, at least one carbonaceous material selected from the group consisting of carbon black (e.g., acetylene black and furnace black), carbon nanotube and carbon nanofiber.

From the viewpoint of electron conductivity, the raw material may be at least one carbonaceous material selected from the group consisting of carbon nanotube and carbon nanofiber. The carbon nanotube and carbon nanofiber may be vapor-grown carbon fiber (VGCF).

The percentage of the electroconductive material in the anode is not particularly limited. For example, it may be 1.0 mass % or more, may be in a range of from 1.0 mass to 12.0 mass %, or may be in a range of from 2.0 mass % to 10.0 mass %.

In addition to the above-mentioned components, the anode may contain other components such as a binder. This is because, due to the use of the particles with a BET specific surface area of from 1.8 m²/g to 19.7 m²/g as the solid electrolyte, the presence or absence of the other components such as a binder in the anode, does not affect the effect of preventing the electroconductive material from being unevenly distributed on the solid electrolyte surface.

As the binder, examples include, but are not limited to, polyvinylidene fluoride (PVdF), polytetrafluoroethylene (PTFE), butylene rubber (BR), styrene-butadiene rubber (SBR), polyvinyl butyral (PVB) and acrylic resin. The binder may be polyvinylidene fluoride (PVdF).

Since a high energy density is obtained, the anode of the disclosed embodiments may be an anode in which the percentage of components other than the anode active material, is small.

1-2. Cathode

The cathode is not particularly limited, as long as it is a cathode that functions as the cathode of the all-solid-state lithium ion secondary battery. In general, the cathode contains a Li-containing cathode active material. As needed, the cathode contains other components such as a binder, a solid electrolyte and an electroconductive material.

In the disclosed embodiments, the Li-containing cathode active material is not particularly limited, as long as it is an active material that contains a Li element. A substance can be used as the cathode active material without particular limitation, as long as it functions as the cathode active material in an electrochemical reaction in relation to the anode active material, and it promotes an electrochemical reaction that involves Li ion transfer. Also, a substance that is known as the cathode active material of a lithium ion battery, can be used in the disclosed embodiments.

The raw material for the cathode active material is not particularly limited, as long as it is a raw material that is applicable to the all-solid-state lithium ion secondary battery. As the raw material, examples include, but are not limited to, lithium cobaltate ($LiCoO_2$), lithium nickelate ($LiNiO_2$), lithium manganate ($LiMn_2O_4$), a different element-substituted Li—Mn spinel of the composition represented by $Li_{1+x}Ni_{1/3}Mn_{1/3}Co_{1/3}O_2$, $Li_{1+x}Mn_{2-x-y}M_yO_4$ (where M is one or more elements selected from Al, Mg, Co, Fe, Ni and Zn), lithium titanate ($Li_xTiO_y$) and lithium metal phosphate ($LiMPO_4$, M=Fe, Mn, Co, Ni, etc.)

The cathode active material may include a coating layer which has lithium ion conductivity and which contains a substance that is not fluidized even when it is in contact with the active material or solid electrolyte. As the substance, examples include, but are not limited to, $LiNbO_3$, $Li_4Ti_5O_{12}$ and $Li_3PO_4$.

The form of the cathode active material is not particularly limited. It may be a film form or particle form.

The percentage of the cathode active material in the cathode is not particularly limited. For example, it may be 60 mass % or more, may be in a range of from 70 mass % to 95 mass %, or may be in a range of from 80 mass % to 90 mass %.

The raw material for the solid electrolyte used in the cathode is not particularly limited, as long as it is a raw material that is applicable to the all-solid-state lithium ion secondary battery. As with the raw material for the solid electrolyte used in the anode, as the raw material, an oxide-based non-crystalline solid electrolyte, a sulfide-based non-crystalline solid electrolyte, a crystalline oxide, a crystalline nitride or the like, all of which have high Li ion conductivity, is preferably used.

As the raw material for the electroconductive material and the raw material for the binder, the same materials as those used in the anode, can be used.

1-3. Solid Electrolyte Layer

The solid electrolyte layer is not particularly limited, as long as it is a solid electrolyte layer that functions as the solid electrolyte of the all-solid-state lithium secondary battery. In general, the solid electrolyte layer contains a solid electrolyte raw material. As needed, it contains other components such as a binder.

As the raw material for the solid electrolyte and the raw material for the binder, the same materials as those used in the cathode, can be used.

The percentage of the solid electrolyte raw material in the solid electrolyte layer is not particularly limited. For example, it may be 50 mass % or more, may be in a range of from 70 mass % to 99.99 mass %, or may be in a range of from 90 mass % to 99.9 mass %.

2. Method for Producing the All-Solid-State Lithium Ion Secondary Battery

The method for producing the all-solid-state lithium ion secondary battery according to the disclosed embodiments, is not particularly limited, as long as it is a method by which the all-solid-state lithium ion secondary battery of the disclosed embodiments can be produced. For example, the all-solid-state lithium ion secondary battery of the disclosed embodiments can be obtained by preparing a battery member comprising a cathode mixture, a solid electrolyte material part, and an anode mixture that contains an anode active material, an electroconductive material and a solid electrolyte, and passing electricity through the battery member.

The method for passing electricity through the battery member is not particularly limited. To efficiently promote the electrochemical alloying reaction as represented by the formula (1), current density may be in a range of from 0.1 $mA/cm^2$ to 6.0 $mA/cm^2$, or voltage may be in a range of from 4.3 V to 4.7 V (vs $Li/Li^+$).

Hereinafter, examples of the production process of the anode mixture, the production process of the cathode mixture, the production process of the solid electrolyte material part, and the production process of the battery member, will be described in this order.

2-1. Anode Mixture

The anode mixture contains an anode active material, an electroconductive material and a solid electrolyte. The anode mixture is not particularly limited, as long as it is an anode mixture which contains, as the anode active material, at least one active material selected from the group consisting of a metal that is able to form an alloy with Li and an oxide of the metal, and which contains, as the solid electrolyte, particles with a BET specific surface area of from 1.8 $m^2/g$ to 19.7 $m^2/g$.

As described above, the anode can be obtained from the anode mixture by passing electricity through the battery member.

As needed, the anode mixture may contain other components such as a binder, in addition to the anode active material, the electroconductive material and the solid electrolyte.

This is because, by using the particles with a BET specific surface area of from 1.8 $m^2/g$ to 19.7 $m^2/g$ as the raw material for the solid electrolyte, the electroconductive material can be kept in an evenly dispersed state in the anode mixture and the anode produced from the anode mixture.

In the case where the BET specific surface area of the solid electrolyte particles in the anode is in a range of from 1.8 $m^2/g$ to 19.7 $m^2/g$, the capacity retention rate is increased by setting the value A in a range of from 12.4 to 56.7. However, from the viewpoint of production, the solid electrolyte particles are likely to aggregate when the value A is too low. Therefore, the value A is preferably from 17.5 to 22.0 (from 17.5 to 56.7).

As the raw materials for the components such as the anode active material, which contains at least one selected from the group consisting of a metal that is able to form an alloy with Li and an oxide of the metal, the electroconductive material, the solid electrolyte and the binder, which is a component incorporated as needed, the same raw materials as those exemplified in the above "1-1. Anode" can be used.

The raw material for forming the anode mixture, that is, the raw material for the anode mixture, may contain components other than the raw materials for the anode active material, the electroconductive material, the solid electrolyte and the binder, which is incorporated as needed. In addition, the raw material for the anode mixture may contain components that are removed in the process of forming the anode mixture. As the components that are contained in the raw material for the anode mixture and removed in the process of forming the anode mixture, examples include, but are not limited to, a solvent and a removable binder. As the removable binder, such a binder can be used, that functions as the binder in the formation of the anode mixture and is decomposed or volatilized and removed by sintering in the step of obtaining the anode mixture, thereby providing a binder-free anode mixture.

The method for forming the anode mixture is not particularly limited. This is because, by using the particles with a BET specific surface area of from 1.8 $m^2/g$ to 19.7 $m^2/g$ as the raw material for the solid electrolyte, the electroconductive material can be kept in an evenly dispersed state in the anode mixture thus formed and the anode produced from the anode mixture.

As the method for forming the anode mixture, examples include, but are not limited to, a method for compression-forming a powder of the raw material for the anode mixture. In the case of compression-forming the powder of the raw material for the anode mixture, generally, a press pressure of from about 400 MPa to about 1000 MPa is applied. The compression-forming may be carried out by using a roll press. In this case, a line pressure may be set to 10 kN/cm to 100 kN/cm.

Also, the following methods can be adopted: a method in which a powder of the raw material for the anode mixture containing the removable binder, is subjected to compression forming and then sintered to remove the binder, and a method in which a dispersion of the raw material for the anode mixture containing the solvent and the removable binder, is applied on the solid electrolyte material part or on a different support, dried, formed into the anode mixture and then sintered to remove the binder.

2-2. Cathode Mixture

In the production method of the disclosed embodiments, the cathode mixture contains, for example, a Li-containing cathode active material. As needed, it contains other raw materials such as a binder, a solid electrolyte and an electroconductive material.

As just described, by passing electricity through the battery member, the cathode can be obtained from the cathode mixture.

As the other raw materials such as the binder, the electroconductive material and the solid electrolyte, the same raw materials as those exemplified above in "1-2. Cathode" can be used.

The raw material for forming the cathode mixture, that is, the raw material for the cathode mixture may further contain components that are removed in the process of forming the cathode mixture. As the components that are contained in the raw material for the cathode mixture and removed in the process of forming the cathode mixture, examples include, but are not limited to, the same components as the solvent that can be incorporated in the raw material for the anode mixture and the removable binder.

As the method for forming the cathode mixture, examples include, but are not limited to, the same method as the method for forming the anode mixture.

2-3. Solid Electrolyte Material Part

In the production method of the disclosed embodiments, the solid electrolyte material part contains a solid electrolyte raw material, for example. As needed, it contains other components.

As described above, by passing electricity through the battery member, the solid electrolyte layer can be obtained from the solid electrolyte material part.

As the solid electrolyte raw material, the same materials as those exemplified above in "1-3. Solid electrolyte layer" can be used.

The percentage of the solid electrolyte raw material in the solid electrolyte material part is not particularly limited. For example, it may be 50 mass % or more, may be in a range of from 70 mass % to 99.99 mass %, or may be in a range of from 90 mass % to 99.9 mass %.

As the other components contained in the solid electrolyte material part, the same materials as those exemplified above in "1-3. Solid electrolyte layer" can be used.

As the method for forming the solid electrolyte material part, examples include, but are not limited to, a method for compression-forming a powder of the solid electrolyte material containing the solid electrolyte raw material and, as needed, other components. In the case of compression-forming the powder of the solid electrolyte material, generally, as with the case of compression-forming the powder of the mixture for the anode, a press pressure of from about 400 MPa to about 1000 MPa is applied. The compression-forming may be carried out by using a roll press. In this case, a line pressure may be set to 10 kN/cm to 100 kN/cm.

As a different method, a cast film forming method can be used, which uses a solution or dispersion of the solid electrolyte material that contains the solid electrolyte raw material and, as needed, other components.

2-4. Battery Member

In the production method of the disclosed embodiments, the battery member in the disclosed embodiments is an assembly of members having the following array structure, for example: the cathode mixture, the solid electrolyte material part and the anode mixture are arranged in this order; they may be directly attached or indirectly attached through a part composed of a different material; and a part composed of a different material may be attached to one or both of the opposite side of the cathode mixture to the position where the solid electrolyte material part is present (the outer side of the cathode mixture) and the opposite side of the anode mixture to the position where the solid electrolyte material part is present (the outer side of the anode mixture) (i.e., a cathode mixture-solid electrolyte material part-anode mixture assembly).

A part composed of a different material may be attached to the battery member, as long as Li ions can be passed in the direction from the cathode mixture side to the anode mixture side through the solid electrolyte material part. A coating layer such as $LiNbO_3$, $Li_4Ti_5O_{12}$ or $Li_3PO_4$ may be disposed between the cathode mixture and the solid electrolyte material part. A current collector, an outer casing, etc., may be attached to one or both of the outer side of the cathode mixture and the outer side of the anode mixture.

The battery member is typically an assembly having the following array structure: the cathode mixture, the anode mixture and the solid electrolyte material part disposed between the cathode mixture and the anode mixture are directly attached, and a part composed of a different material is not attached to both the outer side of the cathode mixture and the outer side of the anode mixture.

The method for producing the battery member is not particularly limited. For example, the battery member may be produced as follows: the powder of the raw material for the anode mixture is put in a compression cylinder for powder compression forming and deposited to a uniform thickness, thereby forming a layer of the powder of the raw material for the anode mixture; a powder of the material for the solid electrolyte, which contains the solid electrolyte powder and, as needed, other components, is placed on the layer of the powder of the raw material for the anode mixture and deposited to a uniform thickness, thereby forming a layer of the powder of the material for the solid electrolyte; a powder of the raw material for the cathode mixture, which contains the Li-containing cathode active material, is placed on the layer of the powder of the material for the solid electrolyte and deposited to a uniform thickness, thereby forming a layer of the powder of the raw material for the cathode mixture; and a powder deposit composed of the three powder deposited layers formed in this manner, is subjected to compression-forming at once, thereby producing the battery member.

The solid electrolyte material part, the anode mixture and the cathode mixture may be produced by a method other than the powder compression forming. Details of the method are as described above. For example, the solid electrolyte material part may be formed by the cast film forming method or a coating method with a die coater, using the solution or dispersion of the solid electrolyte material containing the solid electrolyte raw material. The anode mixture and the cathode mixture may be formed by the following method, for example: a method in which the dispersion containing the powder of the raw material for the anode mixture or cathode mixture and the removable binder, is applied on the solid electrolyte material part or current collector to form a coating film, and the coating film is heated to remove the binder from the coating film, or a method in which the powder containing the raw material for the anode mixture or cathode mixture and the removable binder, is subjected to compression forming to form the powder into the cathode mixture or anode mixture, and the thus-formed product is heated to remove the binder from the coating film. To increase electrode density, the anode mixture and the cathode mixture may be subjected to densification pressing in advance before the compression forming.

The anode mixture and the cathode mixture may be formed on a support other than the solid electrolyte material part or current collector. In this case, the anode mixture and the cathode mixture are removed from the support, and the removed anode mixture or cathode mixture is attached on the solid electrolyte material part.

An example of the method for calculating the discharge capacity retention rate of the all-solid-state lithium ion secondary battery according to the disclosed embodiments, will be described below.

First, the battery is charged with constant current-constant voltage until a predetermined voltage is reached. Next, the charged battery is discharged with constant current-constant voltage. The charging and discharging are determined as one cycle, and X cycles are repeated.

The discharge capacity retention rate after X cycles is calculated by the following formula (5):

$$r = (C_X/C_{1st}) \times 100 \qquad \text{Formula (5)}$$

In the formula (5), r is the discharge capacity retention rate (%) after X cycles; $C_X$ is the discharge capacity (mAh) at the X-th cycle; and $C_{1st}$ is the discharge capacity (mAh) at the first cycle. The value of X is not particularly limited; however, since the initial discharge capacity retention rate is easily influenced by uneven distribution of the electroconductive material in the anode, X may be 10 or less, or it may be 5.

EXAMPLES

1. Production of All-Solid-State Lithium Ion Secondary battery

Example 1

(1) Production of Anode Mixture

Solid electrolyte particles for an anode were prepared as follows.

Under an Ar gas atmosphere, 800 g of sulfide solid electrolyte coarse particles represented by the composition of 15LiBr-10LiI-75(75Li$_2$S-25P$_2$S$_5$), 13 kg of ZrO$_2$ balls (diameter 0.3 mm), 5 kg of dehydrated heptane, and 1.5 kg of di-n-butyl ether were put in the slurry tank of a bead mill (product name: LMZ4, manufactured by: Ashizawa Finetech Ltd.) They were pulverized by wet mechanical milling for 6 hours at a peripheral speed of 12 m/s.

After the pulverization, a heat treatment at 210° C. for 3 hours was carried out using a hot plate, thereby obtaining the solid electrolyte particles for the anode.

Next, 0.62 g of sulfide solid electrolyte particles, which are the thus-prepared solid electrolyte raw material, 0.80 g of elemental silicon particles having an average particle diameter of 5 μm, which are an anode active material raw material, 0.03 g of VGCF, which is an electroconductive material, and 0.32 g of a 5 mass % butyl butyrate solution of a PVdF-based resin, which is a binder, were added to a polypropylene container. The container was subjected to ultrasonic treatment for 30 seconds in an ultrasonic disperser. Then, the container was shaken for 30 minutes using a shaking device, thereby preparing a raw material for the anode mixture.

The thus-prepared raw material for the anode mixture was applied on a Cu foil, which is a current collector, by a blade method using an applicator and dried on the hot plate at 100° C. for 30 minutes. The anode mixture on the current collector was subjected to advance pressing, thereby producing the anode mixture.

(2) Production of Cathode Mixture

First, 0.32 g of a Li$_2$S—P$_2$S$_5$-based non-crystalline solid electrolyte having an average particle diameter of 0.8 μm and containing LiBr and LiI, which is a solid electrolyte raw material, 2.00 g of LiNi$_{1/3}$Co$_{1/3}$Mn$_{1/3}$O$_2$ particles having an average particle diameter of 6 μm, which are a cathode active material raw material, 3.0 g of a 5 mass % butyl butyrate solution of a PVdF-based resin, which is a binder, and VGCF, which is an electroconductive material and in an amount that is 2.5 volume % when the total volume of the solid electrolyte raw material, the cathode active material raw material, the binder and the electroconductive material is determined as 100 volume %, were added to a polypropylene container. The container was subjected to ultrasonic treatment for 30 seconds in the ultrasonic disperser. Then, the container was shaken for 30 minutes using the shaking device, thereby preparing a raw material for the cathode mixture.

The thus-prepared raw material for the cathode mixture was applied on an Al foil, which is a current collector, by the blade method using the applicator and dried on the hot plate at 100° C. for 30 minutes. The cathode mixture on the current collector was subjected to advance pressing, thereby producing the cathode mixture.

(3) Production of Solid Electrolyte Material Part

First, 6.0 g of a Li$_2$S—P$_2$S$_5$-based non-crystalline solid electrolyte having an average particle diameter of 2.5 μm and containing LiBr and LiI, which is a solid electrolyte raw material, and 0.05 g of a 5 mass % butyl butyrate solution of a butylene rubber-based rubber, which is a binder, were added to a polypropylene container. The container was subjected to ultrasonic treatment for 30 seconds in the ultrasonic disperser. Then, the container was shaken for 30 minutes using the shaking device, thereby preparing a paste for the solid electrolyte material part.

The thus-prepared paste for the solid electrolyte material part was applied on an Al foil, which is a substrate, by the blade method using the applicator and dried on the hot plate at 100° C. for 30 minutes, thereby obtaining the solid electrolyte material part. In the same manner, a total of three solid electrolyte material parts were prepared.

(4) Production of Battery Member

The anode mixture obtained in the above (1) and the solid electrolyte material part obtained in the above (3) were stacked so that they were in contact with each other. To the resulting current collector-anode mixture-solid electrolyte material part-aluminum foil laminate, for the purpose of densification, a pressure of 5 kN/cm was applied using a roll press, at a roll gap of 100 μm and a feed rate of 0.5 m/min. The aluminum foil used as the substrate of the solid electrolyte material part was peeled off, thereby obtaining a current collector-anode mixture-solid electrolyte material part laminate.

The cathode mixture obtained in the above (2) and the solid electrolyte material part obtained in the above (3) were stacked so that they were in contact with each other. To the resulting current collector-cathode mixture-solid electrolyte material part-aluminum foil laminate, for the purpose of densification, a pressure of 5 kN/cm was applied using the roll press, at a roll gap of 100 μm and a feed rate of 0.5 m/min. The aluminum foil used as the substrate of the solid electrolyte material part was peeled off, thereby obtaining a current collector-cathode mixture-solid electrolyte material part laminate.

Using a jig, the current collector-anode mixture-solid electrolyte material part laminate densified as described above, was cut to a diameter of 11.74 mm, and the current collector-cathode mixture-solid electrolyte material part laminate densified as described above, was cut to a diameter of 11.28 mm.

The solid electrolyte material part prepared in the above (3) was further stacked on the current collector-anode mixture-solid electrolyte material part laminate cut as described above so that their solid electrolyte material parts were in contact with each other. Then, the aluminum foil used as the substrate was peeled off from the solid electrolyte material part prepared in the above (3).

While the current collector-anode mixture-solid electrolyte material part laminate and the current collector-cathode mixture-solid electrolyte material part laminate were stacked so that the current collector-cathode mixture-solid electrolyte material part laminate was positioned in the center of the current collector-anode mixture-solid electrolyte material part laminate to which the solid electrolyte material part was transferred and their solid electrolyte material parts were in contact with each other, a pressure of 200 MPa was applied for one minute at 130° C., thereby obtaining a battery member including the current collectors.

(5) Production of All-Solid-State Lithium Ion Secondary Battery

Electricity was passed through the thus-obtained battery member with constant current-constant voltage at a 3-hour rate (1/3 C) until a predetermined voltage was reached (cutoff current 1/100 C). Therefore, the all-solid-state lithium secondary battery of Example 1 was obtained.

Example 2

The all-solid-state lithium ion secondary battery of Example 2 was produced in the same manner as Example 1, except that the solid electrolyte particles for the anode were produced as described below.

Under an Ar gas atmosphere, 800 g of sulfide solid electrolyte coarse particles represented by the composition of $15LiBr-10LiI-75(75Li_2S-25P_2S_5)$, 13 kg of $ZrO_2$ balls (diameter 0.3 mm), 5 kg of dehydrated heptane, and 1.5 kg of di-n-butyl ether were put in the slurry tank of a bead mill (product name: LMZ4, manufactured by: Ashizawa Finetech Ltd.) They were pulverized by wet mechanical milling for 4 hours at a peripheral speed of 12 m/s.

After the pulverization, a heat treatment at 210° C. for 3 hours was carried out using the hot plate, thereby obtaining the solid electrolyte particles for the anode.

Example 3

The all-solid-state lithium ion secondary battery of Example 3 was produced in the same manner as Example 1, except that the solid electrolyte particles for the anode were produced as described below.

Under an Ar gas atmosphere, 2 g of sulfide solid electrolyte coarse particles represented by the composition of $15LiBr-10LiI-75(75Li_2S-25P_2S_5)$, 40 g of $ZrO_2$ balls (diameter 0.3 mm), 5 g of dehydrated heptane, and 3 g of di-n-butyl ether were added to a $ZrO_2$ pot (capacity 45 mL). Then, the container was hermetically closed. The $ZrO_2$ pot was installed in a planetary ball mill (product name: P7, manufactured by: FRITSCH). They were pulverized by wet mechanical milling for 20 hours at a plate rotational frequency of 200 rpm. After the pulverization, a heat treatment at 210° C. for 3 hours was carried out using the hot plate, thereby obtaining the solid electrolyte particles for the anode.

Example 4

The all-solid-state lithium ion secondary battery of Example 4 was produced in the same manner as Example 1, except that the solid electrolyte particles for the anode were produced as described below.

Under an Ar gas atmosphere, 800 g of sulfide solid electrolyte coarse particles represented by the composition of $15LiBr-10LiI-75(75Li_2S-25P_2S_5)$, 13 kg of $ZrO_2$ balls (diameter 0.3 mm), 5 kg of dehydrated heptane, and 1.5 kg of di-n-butyl ether were put in the slurry tank of the bead mill (product name: LMZ4, manufactured by: Ashizawa Finetech Ltd.) They were pulverized by wet mechanical milling for 10 minutes at a peripheral speed of 12 m/s. After the pulverization, a heat treatment at 210° C. for 3 hours was carried out using the hot plate, thereby obtaining the solid electrolyte particles for the anode.

Example 5

The all-solid-state lithium ion secondary battery of Example 5 was produced in the same manner as Example 1, except that the solid electrolyte particles for the anode were produced as described below.

Under an Ar gas atmosphere, 2 g of sulfide solid electrolyte coarse particles represented by the composition of $15LiBr-10LiI-75(75Li_2S-25P_2S_5)$, 40 g of $ZrO_2$ balls (diameter 1.0 mm), 5 g of dehydrated heptane, and 3 g of di-n-butyl ether were added to a $ZrO_2$ pot (capacity 45 mL). The container was hermetically closed. The $ZrO_2$ pot was installed in the planetary ball mill (product name: P7, manufactured by: FRITSCH). They were pulverized by wet mechanical milling for 5 hours at a plate rotational frequency of 200 rpm. After the pulverization, a heat treatment at 210° C. for 3 hours was carried out using the hot plate, thereby obtaining the solid electrolyte particles for the anode.

Comparative Example 1

The all-solid-state lithium ion secondary battery of Comparative Example 1 was produced in the same manner as Example 1, except that the solid electrolyte particles for the anode were produced as described below.

Under an Ar gas atmosphere, 30 g of sulfide solid electrolyte coarse particles represented by the composition of $15LiBr-10LiI-75(75Li_2S-25P_2S_5)$, 450 g of $ZrO_2$ balls (diameter 0.3 mm), 200 g of dehydrated heptane, and 80 g of di-n-butyl ether were put in the slurry tank of the bead mill (product name: LMZ4, manufactured by: Ashizawa Finetech Ltd.) They were pulverized by wet mechanical milling for 4 hours at a peripheral speed of 16 m/s. After the pulverization, a heat treatment at 210° C. for 3 hours was carried out using the hot plate, thereby obtaining the solid electrolyte particles for the anode.

Example 6

(1) Production of Anode Mixture

Solid electrolyte particles for an anode were prepared as follows.

Under an Ar gas atmosphere, 50 g of sulfide solid electrolyte coarse particles represented by the composition of 15LiBr-10LiI-75(75Li$_2$S-25P$_2$S$_5$), 485 g of ZrO$_2$ balls (diameter 0.3 mm), 265 g of dehydrated heptane, and 135 g of di-n-butyl ether were put in the slurry tank of a bead mill (product name: LMZ015, manufactured by: Ashizawa Finetech Ltd.) They were pulverized by first wet mechanical milling for one hour at a peripheral speed of 16 m/s.

A slurry was obtained by the first wet mechanical milling. While being kept at 40° C., the slurry was pulverized by second wet mechanical milling for 3 hours at a peripheral speed of 3 m/s.

The slurry obtained by the second wet mechanical milling was dried on the hot plate at 120° C. for 3 hours. Then, a heat treatment at 210° C. for 3 hours was carried out, thereby obtaining the solid electrolyte particles for the anode.

Next, 0.62 g of sulfide solid electrolyte particles, which are the thus-prepared solid electrolyte raw material, 0.80 g of elemental silicon particles having an average particle diameter of 5 μm, which are an anode active raw material, 0.32 g of a 5 mass % butyl butyrate solution of a PVdF-based resin, which is a binder, and 0.03 g of VGCF, which is an electroconductive material, were added to a polypropylene container. The container was subjected to ultrasonic treatment for 30 seconds in the ultrasonic disperser. Then, the container was shaken for 30 minutes using the shaking device, thereby preparing a raw material for the anode mixture.

The thus-prepared raw material for the anode mixture was applied on a Cu foil, which is a current collector, by a blade method using an applicator and dried on the hot plate at 100° C. for 30 minutes. The anode mixture on the current collector was subjected to advance pressing, thereby producing the anode mixture.

(2) Production of Cathode Mixture

First, 0.32 g of a Li$_2$S—P$_2$S$_5$-based non-crystalline solid electrolyte having an average particle diameter of 0.8 μm and containing LiI, which is a solid electrolyte raw material, 2.00 g of LiNi$_{1/3}$Co$_{1/3}$Mn$_{1/3}$O$_2$ particles having an average particle diameter of 4 μm, which are a cathode active material raw material, 0.30 g of a 5 mass % butyl butyrate solution of a PVdF-based resin, which is a binder, and VGCF, which is an electroconductive material and in an amount that is 2.5 volume % when the total volume of the solid electrolyte raw material, the cathode active material raw material, the binder and the electroconductive material is determined as 100 volume %, were added to a polypropylene container. The container was subjected to ultrasonic treatment for 30 seconds in the ultrasonic disperser. Then, the container was shaken for 3 minutes using the shaking device, thereby preparing a raw material for the cathode mixture.

The thus-prepared raw material for the cathode mixture was applied on an Al foil, which is a current collector, by the blade method using the applicator and dried on the hot plate at 100° C. for 30 minutes. The cathode mixture on the current collector was subjected to advance pressing, thereby producing the cathode mixture.

(3) Production of Solid Electrolyte Material Part

First, 0.60 g of a Li$_2$S—P$_2$S$_5$-based non-crystalline solid electrolyte having an average particle diameter of 2.5 μm and containing LiI, which is a solid electrolyte raw material, and 0.05 g of a 5 mass % butyl butyrate of a butylene rubber-based rubber, which is a binder, were added to a polypropylene container. The container was subjected to ultrasonic treatment for 30 seconds in the ultrasonic disperser. Then, the container was shaken for 30 minutes using the shaking device, thereby preparing a paste for the solid electrolyte material part.

The thus-prepared paste for the solid electrolyte material part was applied on the cathode mixture and on the anode mixture by the blade method using the applicator and dried on the hot plate at 100° C. for 30 minutes, thereby obtaining the solid electrolyte material parts.

(4) Production of Battery Member

To the resulting current collector-anode mixture-solid electrolyte material part laminate obtained in the above (3) and the resulting current collector-cathode mixture-solid electrolyte material part laminate obtained in the above (3), for the purpose of densification, a pressure of 5 kN/cm was applied using a roll press, at a roll gap of 100 μm and a feed rate of 0.5 m/min.

Using a jig, the current collector-anode mixture-solid electrolyte material part laminate densified as described above, was cut to a diameter of 13.00 mm, and the current collector-cathode mixture-solid electrolyte material part laminate densified as described above, was cut to a diameter of 11.28 mm.

While the current collector-anode mixture-solid electrolyte material part laminate and the current collector-cathode mixture-solid electrolyte material part laminate were stacked so that the current collector-cathode mixture-solid electrolyte material part laminate was positioned in the center of the current collector-anode mixture-solid electrolyte material part laminate and their solid electrolyte material parts were in contact with each other, a pressure of 200 MPa was applied for one minute at 130° C., thereby obtaining a battery member including the current collectors.

(5) Production of All-Solid-State Lithium Ion Secondary Battery

Electricity was passed through the thus-obtained battery member with constant current-constant voltage at a 3-hour rate (1/3 C) until a predetermined voltage was reached (cutoff current 1/100 C). Therefore, the all-solid-state lithium secondary battery of Example 6 was obtained.

Example 7

The all-solid-state lithium ion secondary battery of Example 7 was produced in the same manner as Example 6, except that the solid electrolyte particles for the anode were produced as described below.

Under an Ar gas atmosphere, 50 g of sulfide solid electrolyte coarse particles represented by the composition of 15LiBr-10LiI-75(75Li$_2$S-25P$_2$S$_5$), 485 g of ZrO$_2$ balls (diameter 0.3 mm), 265 g of dehydrated heptane, and 135 g of di-n-butyl ether were put in the slurry tank of the bead mill (product name: LMZ015, manufactured by: Ashizawa Finetech Ltd.) They were pulverized by first wet mechanical milling for one hour at a peripheral speed of 16 m/s.

A slurry was obtained by the first wet mechanical milling. While being kept at 50° C., the slurry was pulverized by second wet mechanical milling for 2 hours at a peripheral speed of 3 m/s.

The slurry obtained by the second wet mechanical milling was dried on the hot plate at 120° C. for 3 hours. Then, a heat treatment at 210° C. for 3 hours was carried out, thereby obtaining the solid electrolyte particles for the anode.

Example 8

The all-solid-state lithium ion secondary battery of Example 8 was produced in the same manner as Example 6, except that the solid electrolyte particles for the anode were produced as described below.

Under an Ar gas atmosphere, 50 g of sulfide solid electrolyte coarse particles represented by the composition of $15LiBr-10LiI-75(75Li_2S-25P_2S_5)$, 485 g of $ZrO_2$ balls (diameter 0.3 mm), 265 g of dehydrated heptane, and 135 g of di-n-butyl ether were put in the slurry tank of the bead mill (product name: LMZ015, manufactured by: Ashizawa Finetech Ltd.) They were pulverized by first wet mechanical milling for 2 hours at a peripheral speed of 16 m/s.

A slurry was obtained by the first wet mechanical milling. While being kept at 50° C., the slurry was pulverized by second wet mechanical milling for 3 hours at a peripheral speed of 3 m/s.

The slurry obtained by the second wet mechanical milling was dried on the hot plate at 120° C. for 3 hours. Then, a heat treatment at 210° C. for 3 hours was carried out, thereby obtaining the solid electrolyte particles for the anode.

Example 9

The all-solid-state lithium ion secondary battery of Example 9 was produced in the same manner as Example 6, except that the solid electrolyte particles for the anode were produced as described below.

Under an Ar gas atmosphere, 50 g of sulfide solid electrolyte coarse particles represented by the composition of $15LiBr-10LiI-75(75Li_2S-25P_2S_5)$, 485 g of $ZrO_2$ balls (diameter 0.3 mm), 265 g of dehydrated heptane, and 135 g of di-n-butyl ether were put in the slurry tank of the bead mill (product name: LMZ015, manufactured by: Ashizawa Finetech Ltd.) They were pulverized by first wet mechanical milling for 4 hours at a peripheral speed of 16 m/s.

A slurry was obtained by the first wet mechanical milling. While being kept at 50° C., the slurry was pulverized by second wet mechanical milling for 4 hours at a peripheral speed of 3 m/s.

The slurry obtained by the second wet mechanical milling was dried on the hot plate at 120° C. for 3 hours. Then, a heat treatment at 210° C. for 3 hours was carried out, thereby obtaining the solid electrolyte particles for the anode.

Example 10

The all-solid-state lithium ion secondary battery of Example 10 was produced in the same manner as Example 6, except that the solid electrolyte particles for the anode were produced as described below.

Under an Ar gas atmosphere, 75 g of sulfide solid electrolyte coarse particles represented by the composition of $15LiBr-10LiI-75(75Li_2S-25P_2S_5)$, 75 g of $ZrO_2$ balls (diameter 0.3 mm), 120 g of dehydrated heptane, and 80 g of di-n-butyl ether were added to a $ZrO_2$ pot (capacity 500 mL). Then, the container was hermetically closed. The $ZrO_2$ pot was installed in a planetary ball mill (product name: P5, manufactured by: FRITSCH). They were pulverized by wet mechanical milling for 10 hours at a plate rotational frequency of 150 rpm (peripheral speed 1.7 m/s). After the pulverization, the resulting product was dried on the hot plate at 120° C. for 3 hours. Then, a heat treatment at 210° C. for 3 hours was carried out, thereby obtaining the solid electrolyte particles for the anode.

Comparative Example 2

The all-solid-state lithium ion secondary battery of Comparative Example 2 was produced in the same manner as Example 6, except that the solid electrolyte particles for the anode were produced as described below.

Under an Ar gas atmosphere, 50 g of sulfide solid electrolyte coarse particles represented by the composition of $15LiBr-10LiI-75(75Li_2S-25P_2S_5)$, 485 g of $ZrO_2$ balls (diameter 0.3 mm), 265 g of dehydrated heptane, and 135 g of di-n-butyl ether were put in the slurry tank of the bead mill (product name: LMZ015, manufactured by: Ashizawa Finetech Ltd.) They were pulverized by wet mechanical milling for 4 hours at a peripheral speed of 16 m/s.

A slurry thus obtained was dried on the hot plate at 120° C. for 3 hours. Then, a heat treatment at 210° C. for 3 hours was carried out, thereby obtaining the solid electrolyte particles for the anode.

Comparative Example 3

The all-solid-state lithium ion secondary battery of Comparative Example 3 was produced in the same manner as Example 6, except that the solid electrolyte particles for the anode were produced as described below.

Under an Ar gas atmosphere, 50 g of sulfide solid electrolyte coarse particles represented by the composition of $15LiBr-10LiI-75(75Li_2S-25P_2S_5)$, 485 g of $ZrO_2$ balls (diameter 0.3 mm), 265 g of dehydrated heptane, and 135 g of di-n-butyl ether were put in the slurry tank of the bead mill (product name: LMZ015, manufactured by: Ashizawa Finetech Ltd.) They were pulverized by first wet mechanical milling for one hour at a peripheral speed of 16 m/s.

A slurry was obtained by the first wet mechanical milling. While being kept at 50° C., the slurry was pulverized by second wet mechanical milling for 3 hours at a peripheral speed of 5 m/s.

The slurry obtained by the second wet mechanical milling was dried on the hot plate at 120° C. for 3 hours. Then, a heat treatment at 210° C. for 3 hours was carried out, thereby obtaining the solid electrolyte particles for the anode.

Comparative Example 4

The all-solid-state lithium ion secondary battery of Comparative Example 4 was produced in the same manner as Example 6, except that the solid electrolyte particles for the anode were produced as described below.

Under an Ar gas atmosphere, 50 g of sulfide solid electrolyte coarse particles represented by the composition of $15LiBr-10LiI-75(75Li_2S-25P_2S_5)$, 485 g of $ZrO_2$ balls (diameter 0.3 mm), 265 g of dehydrated heptane, and 135 g of di-n-butyl ether were put in the slurry tank of the bead mill (product name: LMZ015, manufactured by: Ashizawa Finetech Ltd.) They were pulverized by first wet mechanical milling for one hour at a peripheral speed of 16 m/s.

A slurry was obtained by the first wet mechanical milling. While being kept at 50° C., the slurry was pulverized by second wet mechanical milling for 3 hours at a peripheral speed of 7 m/s.

The slurry obtained by the second wet mechanical milling was dried on the hot plate at 120° C. for 3 hours. Then, a heat treatment at 210° C. for 3 hours was carried out, thereby obtaining the solid electrolyte particles for the anode.

2. Evaluation (1) Measurement of BET Specific Surface Area, Median Diameter, Secondary Particle Diameter After Pulverizing, and Density of Solid Electrolyte for Anode The BET specific surface area ($m^2/g$) of the solid electrolyte for the anode was measured by a specific surface area measuring machine (product name: NOVA E2000, manufactured by: Quantachrome Instruments Japan G.K.)

The median diameter D50 ($\mu m$) of the solid electrolyte for the anode was measured by a dynamic light scattering (DLS) particle size distribution measuring machine (product name: NANOTRAC WAVE, manufactured by: MicrotracBEL Corp.)

The secondary particle diameter of the solid electrolyte for the anode after pulverizing, was obtained as follows. First, 250 g of the above-obtained solid electrolyte for the anode and 350 g of butyl butyrate were mixed to obtain a mixture. The mixture is subjected to ultrasonic treatment for seconds in an ultasonic disperser (product name: UNTRASONIC PROCESSOR UIP500HD, manufactured by: Hielscher) to obtain a paste. The secondary particle diameter of the solid electrolyte for the anode contained in the paste, was measured by a particle size gauge (product name: GRAIN GAUGE, manufactured by: Dai-Ichi Sokuhan Works Co.)

The density ($g/cm^3$) of the solid electrolyte for the anode was measured by a specific gravity measuring machine (product name: AUW120D SMK-401, manufactured by: Shimadzu Corporation).

(2) Evaluation for Cycle Characteristics

The all-solid-state lithium ion secondary batteries of Examples 1 to 10 and Comparative Examples 1 to 4 were discharged with constant current-constant voltage.

First, the thus-obtained all-solid-state lithium ion secondary batteries of Examples 1 to 10 and Comparative Examples 1 to 4 were discharged each (cutoff current 1/100 C). After the discharging, each battery was charged with constant current-constant voltage at a 3-hour rate (1/3 C) until a predetermined voltage was reached, and then it was discharged with constant current-constant voltage. A discharge capacity at the first cycle was measured.

In the same condition, the charge-discharge cycle was repeated five times (a total of five cycles) and a discharge capacity at the 5th cycle was measured.

A capacity retention rate at the 5th cycle was calculated by dividing the discharge capacity at the 5th cycle by the discharge capacity at the first cycle.

3. Results

Table 1 shows the measurement results of the BET specific surface area and median diameter of the solid electrolyte for the anode, the value A obtained by the formula (1) using these values, and the specific capacity retention rate at the 5th cycle when the capacity retention rate at the 5th cycle of the all-solid-state lithium ion secondary battery of Comparative Example 1, is determined as 100%.

Table 2 shows the measurement results of the BET specific surface area and median diameter of the solid electrolyte for the anode, the value A obtained by the formula (1) using these values, the secondary particle diameter after pulverizing, and the specific capacity retention rate at the 5th cycle when the capacity retention rate at the 5th cycle of the all-solid-state lithium ion secondary battery of Comparative Example 2, is determined as 100%.

TABLE 1

| | BET specific surface area ($m^2/g$) | Particle diameter D50 ($\mu m$) | Value A | Specific capacity retention rate (%) at 5th cycle |
|---|---|---|---|---|
| Example 1 | 19.7 | 1.3 | 56.7 | 108 |
| Example 2 | 13.4 | 1.6 | 46.7 | 109 |
| Example 3 | 6.6 | 1.0 | 14.3 | 109 |
| Example 4 | 5.7 | 2.0 | 24.7 | 109 |
| Example 5 | 1.8 | 3.3 | 13.1 | 109 |
| Comparative Example 1 | 28.4 | 1.0 | 61.8 | 100 |

TABLE 2

| | BET specific surface area ($m^2/g$) | Particle diameter D50 ($\mu m$) | Value A | Secondary particle diameter after pulverizing | Specific capacity retention rate (%) at 5th cycle |
|---|---|---|---|---|---|
| Example 6 | 12 | 0.83 | 22.0 | 31 | 108 |
| Example 7 | 10 | 0.80 | 17.5 | 31 | 108 |
| Example 8 | 11 | 0.82 | 19.7 | 31 | 108 |
| Example 9 | 11 | 0.91 | 21.3 | 31 | 108 |
| Example 10 | 7 | 0.80 | 12.4 | 50 | 108 |
| Comparative Example 2 | 28 | 0.70 | 43.6 | 30 | 100 |
| Comparative Example 3 | 22 | 1.05 | 51.3 | 30 | 100 |
| Comparative Example 4 | 24 | 1.27 | 67.7 | 30 | 100 |

As shown in Table 1, when the capacity retention rate at the 5th cycle of the battery of Comparative Example 1, in which the BET specific surface area of the solid electrolyte for the anode is 28.4 $m^2/g$, is determined as 100%, the specific capacity retention rate at the 5th cycle of the batteries of Examples 1 to 5, in which the BET specific surface area is from 1.8 $m^2/g$ to 19.7 $m^2/g$, is from 108% to 109% and high.

When the BET specific surface area is more than 19.7 $m^2/g$, the electroconductive material is likely to attach to the solid electrolyte particles, and an area where the density of the electroconductive material is low, occurs in the anode. Therefore, it is considered that this is because, in a process during which the volume of the whole anode is expanded/shrunk by charging/discharging, an electron conducting path in the area where the density of the electroconductive material is low, is gradually cut.

The specific capacity retention rate at the 5th cycle of the batteries of Examples 1 to 5, in which the value A (the value indicating the form of the solid electrolyte for the anode) is from 13.1 to 56.7, are higher than the battery of Comparative Example 1, in which the value A is 61.8. As the value A gets closer to 6.0, the form gets closer to a perfect spherical form. Therefore, it is considered that a higher cycle retention rate is obtained when the form of the solid electrolyte particles gets closer to a perfect spherical form.

As shown in Table 2, when the capacity retention rate at the 5th cycle of the battery of Comparative Example 2, in which the BET specific surface area of the solid electrolyte for the anode is 28 $m^2/g$, is determined as 100%, the specific capacity retention rate at the 5th cycle of the batteries of Examples 6 to 10, in which the BET specific surface area is from 7 m²/g to 12 m²/g, is 108% and high.

The batteries shown in Table 2 differ from the batteries shown in Table 1 in production method, materials, etc. However, as for the relationship between the BET specific surface area and cycle retention rate of the solid electrolyte for the anode, the batteries shown in Table 2 obtained similar results to the batteries shown in Table 1, and the results shown in Table 2 provided confirmation of the results shown in Table 1.

Also, in Table 2, the specific capacity retention rate at the 5th cycle of the batteries of Examples 6 to 10, in which the value A representing the form of the solid electrolyte for the anode is from 12.4 to 22.0, is higher than the batteries of Comparative Examples 2 to 4, in which the value A is from 43.6 to 67.7. As for this point, the results shown in Table 2 also provided confirmation of the results shown in Table 1.

For the solid electrolyte particles for the anode of Example 10, in which the value A is 12.4, the secondary particle diameter after pulverizing is 50 μm and larger than Examples 6 to 9 in which the value A is from 17.5 to 22.0. The secondary particle diameter after pulverizing is thought to relate to the dispersibility of the solid electrolyte particles for the anode. Accordingly, from the point of view that the particle dispersing energy can be decreased in the production of the solid electrolyte particles for the anode, it is thought that it is preferable to use the solid electrolyte particles for the anode, in which the value A is from 17.5 to 22.0.

From the above results, it is clear that the all-solid-state lithium ion secondary battery wherein the anode comprises an anode active material, an electroconductive material and a solid electrolyte; wherein the anode active material comprises at least one active material selected from the group consisting of a metal that is able to form an alloy with Li, an oxide of the metal, and an alloy of the metal and Li; and wherein the solid electrolyte is particles with a BET specific surface area of from 1.8 m²/g to 19.7 m²/g, is excellent in cycle characteristics.

REFERENCE SIGNS LIST

1. Solid electrolyte layer
2. Cathode
3. Anode
101. Cathode-solid electrolyte layer-anode assembly

The invention claimed is:

1. An all-solid-state lithium ion secondary battery,
wherein an anode comprises an anode active material, an electroconductive material and a solid electrolyte;
wherein the anode active material comprises at least one active material selected from the group consisting of a metal that is able to form an alloy with Li, an oxide of the metal, and an alloy of the metal and Li;
wherein the solid electrolyte is particles with a BET specific surface area of from 7 m²/g to 12 m2/g;
wherein a median diameter D50 of the solid electrolyte particles is from 0.8 μm to 3.3 μm; and
wherein, for the solid electrolyte particles, a value A obtained by the following Formula (1) is in a range of from 12.4 to 22.0:

$$A = \text{BET specific surface area (m}^2\text{/g)} \times \text{median diameter } D50 \text{ (μm)} \times \text{density (g/cm}^3\text{)}. \quad \text{Formula (1)}$$

2. The all-solid-state lithium ion secondary battery according to claim 1, wherein, for the solid electrolyte particles, the value A is in a range of from 17.5 to 22.0.

3. The all-solid-state lithium ion secondary battery according to claim 1, wherein the anode active material comprises at least one active material selected from the group consisting of elemental silicon and an alloy of Si and Li.

4. The all-solid-state lithium ion secondary battery according to claim 1, wherein the solid electrolyte is a sulfide solid electrolyte.

5. The all-solid-state lithium ion secondary battery according to claim 1, wherein the electroconductive material is at least one carbonaceous material selected from the group consisting of carbon black, carbon nanotube and carbon nanofiber.

* * * * *